United States Patent Office 3,799,877
Patented Mar. 26, 1974

3,799,877
METHOD OF PREPARING HYDROCARBYL-SUBSTITUTED HETEROCYCLIC NITROGEN COMPOUNDS, REACTION PRODUCTS PREPARED THEREBY AND COMPOSITIONS CONTAINING SAME
John C. Nnadi, Glassboro, and Phillip S. Landis, Woodbury, N.J., assignors to Mobil Oil Corporation, New York, N.Y.
No Drawing. Filed Jan. 24, 1972, Ser. No. 220,466
Int. Cl. C10m 1/32, 3/26
U.S. Cl. 252—51.5 R    9 Claims

ABSTRACT OF THE DISCLOSURE

Alpha-hydrocarbyl or beta-hydrocarbyl mono- and bis-lactams, hydrocarbyl tetrahydropyrrolidines and mixtures thereof are obtained by the steps of reducing a maleic anhydride-olefin adduct with a metal or ammonium hydride, in the presence of a solvent in which the said anhydride is not associated, and reacting the resulting product with an amine, such as alkylene-polyamine, to produce the resulting product. Alternatively, the maleic anhydride-olefin adduct is reacted with the amine or polyamine to produce the corresponding imido or bis-imido type product, followed by the said reducing step. The maleic anhydride-olefin adduct of particular interest is an alkenylsuccinic anhydride, preferably in which the alkenyl group is a radical of from about 6 to about 600, and preferably from about 20 to about 300, carbon atoms. The products of this invention have utility as detergents or dispersants in industrial organic fluids, such as lubricating oils, and fuels. They also act as neutralizing agents, anticorrosion agents and the like.

BACKGROUND OF THE INVENTION

Field of the invention

This invention relates to a method of producing lactams and tetrahydropyrrolidines, and in particular it relates to hydrocarbyl-substituted lactams and pyrrolidines, to reaction mixtures containing the same and to the use thereof in organic fluid compositions.

Description of the prior art

The use of high molecular weight ashless additives in lubricating and fuel compositions is known in U.S. Pat. Nos. 3,172,892 and 3,216,936 and 3,219,666. High molecular weight succinic acid-polyamine additives have been prepared and used in lubricating oils. However, none of these references discloses the preparation and use of oil-soluble alpha- or beta-hydrocarbyl lactams or mixtures thereof as dispersants in hydrocarbon fluids or other industrial fluids.

It is also known to reduce succinic anhydride or maleic anhydride by direct hydrogenation in the presence of a nickel or cobalt type of catalyst or palladium under high pressure of at least 200 p.s.i.g. Such high pressure catalytic hydrogenation is described in U.S. 2,772,292, 2,772,293, 3,113,138 and 3,492,314. However, none of these references describes noncatalytic reduction of alkyl and/or alkenyl succinic anhydride to produce lactones of high molecular weight.

Reduction of cyclic anhydrides with sodium borohydride is described by D. M. Bailey and R. E. Johnson in Journal of Organic Chemistry, vol. 35, page 3574 (1970). However, this reference does not describe the making of lactams, pyrrolidines or higher hydrocarbyl-substituted products from imides or anhydrides. U.S. application No. 100,543, filed on Dec. 21, 1970 also discusses reduction of alkenylsuccinic anhydrides to lactone.

SUMMARY OF THE INVENTION

It has now been discovered that new ashless multifunctional agents having both detergent and dispersant properties (as well as antioxidant properties) may be prepared by reacting a maleic anhydride-olefin adduct with a metal hydride, preferably an alkali metal hydride or a metal or ammonium borohydride and reacting the resulting reaction mixture with an amine or an alkylenepolyamine. Using an alkenylsuccinic anhydride as the adduct, the reaction mixture would consist of alpha- or beta-hydrocarbyl-substituted lactams or bis-lactams or mixtures thereof, or the corresponding hydrocarbyl-substituted tetrahydropyrrolidines or bis-tetrahydropyrrolidines or mixtures of both. Alternatively, the maleic anhydride-olefin adduct may first be reacted with the amine or polyamine to produce the corresponding imido or bis-imido product and this product is reacted with the hydride or borohydride.

DESCRIPTION OF SPECIFIC EMBODIMENTS

In accordance with one aspect of the process of this invention, high yields of alpha- or beta-substituted lactams are obtained by preparing the lactone precursor from maleic anhydride-olefin adduct, such as an alkyl- or alkenyl-succinic anhydride. It is known (for example, U.S. 2,568,876) to obtain the anhydride by reacting maleic anhydride with an olefin or a halogenated olefin or polymeric olefin obtained from ethylene, propylene, butylene or amylene, and preferably polypropylene or polybutene. Other suitable olefins include hexene, octene, decene, dodecene, hexadecene, eicosene, docosene, tricosene and the like. The alkenyl groups useful for the purpose of this invention may thus contain from 6 to 600 carbon atoms, derived from olefins having molecular weights of from about 80 to almost 8,000. The alkenylsuccinic anhydrides of particular interest in this invention are those in which the alkenyl group contains from 20 to about 300 carbon atoms, and most preferably from 25 to 150.

Also suitable are copolymers of maleic anhydride and olefins, which are understood to be products of addition, such as those stated above or styrene or vinyl compounds, such as vinylbutylether, and the like. Molecular weights of such copolymers may range up to over 1,000,000. Methods of preparing such copolymers are not part of this invention. However, it is known that succinic anhydride-type groups occur as part of the polymer network. Macromolecules of the said copolymers containing such groups may be employed as the adduct in this invention. The final reaction products using such copolymers upon reduction and reaction with amine would thus contain polylactam and poly-pyrrolidine groups.

In accordance with one particular aspect of this invention, an alkenylsuccinic anhydride is reacted with a metal hydride or metal or ammonium borohydride, preferably in the presence of a solvent in which the alkenylsuccinic anhydride is not associated, that is, the solvent does not form a complex or aggregate molecule with the anhydride. Normal reduction of polymeric alkenylsuccinic anhydride under moderate conditions as used in this invention would ordinarily be carried out with difficulty, if at all, because of the hindering effect of the long chain alkenyl groups in the anhydride molecule. Past attempts at hydrogenation have required catalytic conditions, extremely high temperatures or pressures or combinations of these conditions. However, it has been discovered that by the use of the preferred hydride or borohydride-solvent system of this invention, selective reduction of the polyalkenylsuccinic anhydride to the corresponding alpha- or beta-alkyl or alkenyl lactone or to the corresponding alkyl or alkenyl tetrahydrofuran may be carried out under moderate conditions. It is understood that at least one of the carbonyl groups of the succinic anhydride is reduced to —CH$_2$—. Furthermore, some or all the alkenyl may be converted to alkyl. Since there may be one or both of alkenyl and alkyl groups present in the components of the reaction mixture, the term "hydrocarbyl" is hereinafter used to signify either or both substituents.

As the reducing agent in this first step are the hydrides and borohydrides of a metal, preferably containing sodium, potassium or lithium, or the lower alkoxy derivatives (1 to 6 carbon atoms) thereof, or ammonium borohydride. Preferred are sodium borohydride, (NaBH$_4$), lithium aluminum hydride, sodium borohydride trimethoxide, sodium bis(2-methoxyethoxy) aluminum hydride and the like. The amounts used are usually about from 0.05 to 10 moles of reducing agent per mole of anhydride and preferably from about 0.5 to about 6 hydrogen atoms of reducing agent per mole of anhydride to be reduced. For example, to reduce one carbonyl of the succinic anhydride to a —CH$_2$— group with sodium borohydride would in theory require a mole ratio of 1:1 of agent to anhydride.

The preferred nonassociative solvent is tetrahydrofuran. Also useful are lower molecular weight amides, alcohols and glycols of from 1 to 10 carbon atoms or mixtures of these with other, normally inert, organic sovents, such as benzene, toluene and the like. The temperature of this reaction may range from 0° C. to the boiling point of the solvent, and preferably from about 20° C. to about 100° C. Upon conversion of the anhydride to the lactone or to the tetrahydrofuran, the reaction mixture is washed with slightly acidic water washes and the product is extracted with any organic solvent immiscible with water, preferably low boiling hydrocarbons, aromatics and ethers. The extracting solvent is thereafter removed by stripping or other means.

As discussed previously, the product of this first step is understood to consist either of alpha-hydrocarbyl lactone or beta-hydrocarbyl lactone or 2-hydrocarbyl tetrahydrofuran or mixtures thereof. A typical reaction product mixture may contain a predominant amount of lactone and up to about 20 mole percent of the tetrahydrofuran.

To this mixture is added an amine having from 1 to about 40, and preferably from 2 to 20, carbon atoms or an alkylenepolyamine having from 2 to 10 nitrogen atoms and from 1 to about 9 alkylene groups, i.e.

H$_2$N—(RNH)$_n$H wherein $n$ is an integer of from 1 to 9 and R is an alkylene group of from 1 to about 5 carbon atoms. The alkylene group R is preferably ethylene or methyl-substituted ethylene. The preferred amines include the alkylene polyamines, such as ethylenediamine, diethylenetriamine, triethylenetetramine, tetraethylenepentamine, pentaethylenehexamine and the like. Satisfactory amines include alkyl amines, dialkyl amines, cycloalkyl amines and aralkyl amines, such as methylamine, ethylamine, propylamine, butylamine, octylamine, decylamine, diethylamine, dibutylamine, cyclohexylamine, benzylamine and the like.

The amounts of reactants used are sufficient to provide a ratio of total moles of lactone or tetrahydrofuran in the reaction mixture obtained from the first step to the number of —NH$_2$ groups in the amine in the range of from 0.05:1 to 3:1, and preferably 0.5:1 to 2:1.

For example, the reaction between the amine and the lactone to produce a lactam requires the removal of a mole of water, as in the following sequence:

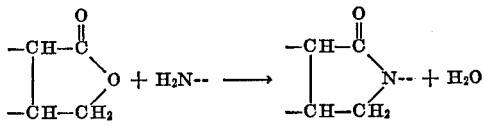

Two moles of water are removed if the bis-lactam is prepared from a polyamine. There may also occur some reaction with internal nitrogen atoms, presumably after (but perhaps also before) the terminal nitrogen atoms are reacted, as in the following sequence:

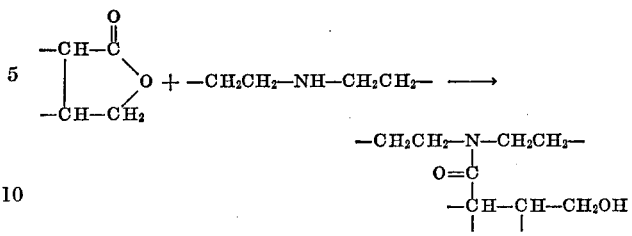

In fact, many types of such side reactions may occur during the two-step sequence. These other reaction products may or may not be present, or they are present in varying concentrations, but they are believed to be usually of minor amount.

Both hydrocarbyl lactams and hydrocarbyl pyrrolidines and the reaction mixtures of this invention have utility as detergents or dispersants in industrial organic fluids, such as lubricating oils, transmission fluids, gasoline and other liquid fuels, greases and the like. For example, the performance of the preferred products (prepared from polyamines and high molecular weight alkenylsuccinic anhydride) in lubricating oils for maintaining engine cleanliness is very good. Moreover, since these products contain no metal, oxidation or deterioration thereof in their fluid environment would not lead to the formation of unduly harmful deposits in engines. The amount of available nitrogen in this additive, particularly the bis-lactam, provides neutralizing properties when the industrial fluid is used under oxidizing conditions.

In a preferred modification of this invention, the reaction products of this invention are obtained by first reacting the alkenylsuccinic anhydride or other olefin-maleic acid adduct with the amine or polyamine, to form an alkenylsuccinimide or bis-alkenylsuccinimide intermediate, and reducing that intermediate with the hydride or borohydride reducing agent in any desired organic solvent. Preparation of reaction products containing the succinimides are known in the art. Upon reduction thereof, products in the final reaction mixture may have the lactam or pyrrolidine groups:

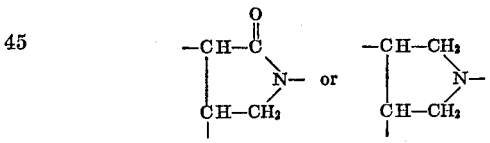

Of particular interest is the reduction of a bis(alkenylsuccinimide) of a polyamine having the general formula

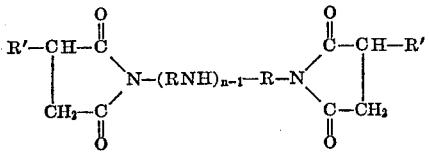

wherein R and $n$ have the values previously described, and R' is an alkenyl group of from 20 to about 300 carbon atoms, preferably a polypropenyl or polybutenyl radical. The resulting reduction step produces a reaction product containing a bis-lactam or a bis-pyrrolidine product or a mixture of these. The preferred polyamine is tetraethylenepentamine ($n$ is 4).

Although the products of this invention are generally useful in liquid organic compositions, those containing the lower hydrocarbyl groups, that is, from 8 to about 15 carbon atoms, have value as neutralizing agents for acidic oxidation products, anti-corrosion agents and the like. However, the products containing hydrocarbyl substituents of from 20 to about 300 carbon atoms, most preferably from 25 to about 150 carbon atoms, are of particular interest because of their excellent detergent or dispersant properties. These reaction products are useful alone or in conjunction with other additives normally used in industrial fluids, including the metal phosphorus and sulfur compounds, such as zinc phosphorodithioates, calcium and barium sulfonates and phenates and the like.

This invention may be more clearly illustrated by the following embodiments although they should not be considered in any way a limitation on the present invention.

EXAMPLE 1

Into a suitable reactor are added 100 ml. of tetrahydrofuran in which are suspended 10 grams (0.26 mole) of sodium borohydride. While the suspension is stirred, a solution of 340 grams of a polybutenylsuccinic anhydride (in which the polybutenyl group has a formula weight of about 900) in 500 ml. of tetrahydrofuran is added over a period of 20 minutes. The mixture is stirred for about 4 hours at 20° C. during which time the reaction is followed by infra-red analysis periodically. The reaction is cooled in ice bath and then quenched by addition of 100 ml. of 6 N hydrochloric acid followed by addition of 250 ml. of water. The organic phase is extracted with about 1,000 cc. of ether. The ether extract is separated and washed twice with 100 ml. of water. The ether is distilled off leaving a residue of 332 grams. The product, a brown viscous liquid, has a saponification number of 45 (as compared with 74 for the initial anhydride). Infra-red spectroscopy shows the presence of lactone and no anhydride remaining.

EXAMPLE 2

In a reactor similar to that used in Example 1, 130 grams (about 0.13 mole theoretically) of the reaction product of Example 1 is mixed with 10 grams (0.053 mole) of tetraethylenepentamine and the mixture is heated to 150° to 200° C. under nitrogen for 4 hours. During the 4-hour period about 90% of the theoretical amount of water is removed (about 1.6 grams of water). At the end of this period, the reaction mixture is dissolved in about 500 ml. of toluene and washed with water until the mixture is neutral to litmus. Emulsion formed during these water washes is broken by the addition of 200 ml. of n-butanol. The toluene, butanol and water are removed by distillation, and the residue is held at 150° C. under nitrogen and a vacuum of 3 to 20 mm. Hg for two hours. The final reaction product of 135 grams has the following analysis.

*Analysis.*—Found (percent): N, 1.85; basic N, 1.15. Calc'd (percent): N, 2.10; basic N, 1.40.

Chromatographic analysis indicates that the predominant component of the reaction mixture is the bis-lactam of a hydrocarbyl lactone and tetraethylenepentamine.

EXAMPLE 3

The product of Example 2 is prepared in a larger amount by adding 1900 grams (1.9 moles) of the anhydride and 1300 grams of tetrahydrofuran to a suspension of 58 grams (1.52 mole) of sodium borohydride suspended in 200 grams of tetrahydrofuran. Periodic infra-red analysis indicates reduction of the anhydride. The washes are again carried out followed by extraction in one pound of ether, followed by 200 ml. water wash.

The bis-lactam is prepared by reacting 1800 grams of the product obtained above with 125 grams of tetraethylenepentamine; the temperature upon heating ranges from 150° to 180° C. for two hours. After the two hours, under nitrogen and atmospheric pressure, 15 ml. of water is distilled off. The mixture is heated as in Example 2 at 180° C. for three hours, yields an additional 3 ml. of water. Continued heating at 210° C. under nitrogen yields no additional water indicating complete reaction. The reaction mixture is treated as in Example 2. The product has the following analysis:

*Analysis.*—Found (percent): N, 2.1; basic N, 1.3. Calc'd (percent): N, 2.10; basic N, 1.4.

EXAMPLE 4

A bis-lactam is prepared in a procedure similar to that of the preceding examples wherein the polybutenyl group of the succinic anhydride reactant has a formula weight of about 1300. From the reaction of 6 grams of sodium borohydride suspended in 50 ml. of tetrahydrofuran and 430 grams of polybutenylsuccinic anhydride (molecular weight of the polybutene being 1300) dissolved in 1000 ml. of tetrahydrofuran, 420 grams of the lactone is obtained as shown by infra-red analysis.

This lactone is then reacted with tetraethylenepentamine in 2:1 molar ratio to give the corresponding bis(substituted lactam).

EXAMPLE 5

In a suitable reactor containing 220 cc. of 70% solution of sodium bis(2-methoxyethoxy)aluminum hydride in benzene and 500 ml. tetrahydrofuran are added 270 grams (0.1 mole) of a bis-imide prepared by reacting the polybutenylsuccinic anhydride of Example 1 and tetraethylenepentamine in a mole ratio of 2:1, in 1500 ml. of tetrahydrofuran. The reaction mixture is stirred for a period of about 4 hours at a temperature which increases from 20° up to 70° C. The reaction mixture is quenched with HCl and water washed as in Example 1 and the organic portion extracted in ether. Infra-red spectroscopy shows almost complete disappearance of carbonyl absorption and thus indicates the presence of the bis(substituted pyrrolidine) of tetraethylenepentamine.

The same reaction is carried out using lithium aluminum hydride as the reducing agent. Reaction is continued over a period of from 1 to 3 days. The reaction mixture contains the pyrrolidine as produced in the preceding paragraph. The analysis of this product is as follows:

*Analysis.*—Found (percent): N, 1.98; basic N, 1.53. Calc'd (percent): N, 2.0.

EXAMPLE 6

The polybutenylsuccinic anhydride of Example 1 is reacted with ethylenediamine in a 1:1 mole ratio. During the reaction approximately 1 mole of water is removed. The resulting N-aminoethyl-2-poly(butenyl)succinimide in tetrahydrofuran is added to a suspension of sodium borohydride in tetrahydrofuran. The mole ratio of imide to borohydride is approximately 1:1. The reaction mixture contains N-ethylamino-alpha-substituted butyrolactam.

EXAMPLE 7

The polybutenyl succinic anhydride of Example 1 is reacted with tetraethylenepentamine in sufficient mole ratio to produce the bis-succinimide thereof.

The said bis-succinimide (270 grams, 0.1 mole) is dissolved in 1500 ml. of tetrahydrofuran and 90 ml. of sodium bis(2-methoxyethoxy)aluminum hydride suspended in 500 ml. of tetrahydrofuran are added. The reaction is carried out as in Example 5.

Infra-red gel permeation chromatographic analyses indicate that the predominant component of the reaction mixture is the bis(substituted lactam) of tetraethylenepentamine.

Evaluation of products

The products of this invention are tested in an oil environment for their detergent and dispersant properties and the ability of the additive to help solubilize polar impurities which may form in the oil during use, such as in an engine or transmission system or the like.

(1) The products of Examples 3 and 5 are tested in the Pyruvic and Sulfuric Acid dispersancy tests. The procedures of these tests are described in detail in U.S. 3,368,972. The product is dissolved at a concentration of 3% by weight in an SAE 30 straight grade mineral oil blend having a 64.1 SUV at 210° F.

| Product | Pyruvic acid, percent | Sulfuric acid |
|---|---|---|
| Example 3 | 99.9 | 0.004 |
| Example 4 | 100 | 0.000 |
| Example 7 | 100 | 0.000 |
| Oil alone | 82.4 | 0.162 |

In these tests the higher the pyruvic acid value and the lower the sulfuric acid value, the better the additive.

(2) The ability of an oil additive to permit the oil composition to solubilize or to take up and retain polar substances formed in the oil during use is advantageous. It can prevent corrosion and leads to more uniform functioning of the oil. Polar compounds usually are present owing to the oxidation of organic materials or the condensation of water. Tests on hydroxybenzoic acid take-up in oil and water solubilization have been used to measure this ability. The additive is the product of Example 3. An excess of the p-hydroxybenzoic acid is added to a white oil composition containing 5% by weight of the additive at 140° C. with stirring for about an hour. About 5 grams of acid per 100 cc. of sample is above the solubility concentration. Then a sample of the oil is withdrawn and mixed with an alcohol, benzene and water 250:220:50 by volume) and titrated with sodium hydroxide. In the water solubilization test, about 2 cc. of water is added to 10 cc. of a solution of benzene containing 5% by weight of the additive at 25° C. and the sample is titrated with standard Karl Fischer reagent. The results are as follows:

Test: Result
p-Hydroxybenzoic
  acid uptake _____ 1.84 per mole of nitrogen.
Water solubilization ____ 0.08%.

(3) In this test, the test oil is the same blend of mineral oils used in the above pyruvic and sulfuric acid tests, containing 5% by weight of the reaction product of Example 7. The test equipment is a modified Dornte unit similar to the bulk oxidation test equipment described in U.S. 3,554,945. In this case, however, the size of the oil sample is 50 grams. The test is operated at 185° C. using an air circulation rate of 23 liters per hour for a period of 17 hours. The test measures the amount of oxygen consumed based on standard conditions. A formulated base oil without the Example 7 product results in oxygen absorptions ranging from about 904 to 1021 cc. of oxygen. The formulated oil blend containing the reaction product of Example 7 gives an oxygen absorption of only 324 cc. It should be noted that this test measures the ability of an oil additive to inhibit oxidation of the base oil and, hence, the lower amount of oxygen absorbed within the oil, the better the additive.

This invention has been described in terms of broad and narrow scope and is deemed to include any obvious modifications of this description which may be obvious to one skilled in the art. Having described our invention thus, we claim:

1. An organic fluid composition comprising a major amount of an organic fluid selected from the group consisting of lubricating oils and greases prepared therefrom, transmission fluids and normally liquid hydrocarbon fuels and a minor amount sufficient to provide detergent properties thereto of a final reaction product selected from the group consisting of a bis-(alpha-hydrocarbyl lactam), a bis-(beta-hydrocarbyl lactam), a bis-(hydrocarbyl pyrrolidine) and mixtures thereof prepared by the steps of:
(1) reacting a maleic anhydride-olefin adduct containing at least one succinic anhydride group with a first member selected from the group consisting of (a) a reducing agent selected from the group consisting of a metal hydride, a metal borohydride and ammonium borohydride and alkoxy derivatives thereof having from 1 to 6 carbon atoms and (b) an amine selected from the group consisting of alkylene polyamines having from 2 to 10 nitrogen atoms and from 1 to 9 alkylene groups; and (2) reacting the product of step (1) with the other member of said group.

2. The composition of claim 1 wherein the maleic anhydride-olefin adduct is an alkenylsuccinic anhydride having from 6 to 600 carbon atoms in the alkenyl group.

3. The composition of claim 2 wherein the alkenylsuccinic anhydride is initially reacted with the reducing agent and the resulting reaction product is reacted with the amine.

4. The composition of claim 3 wherein the alkenylsuccinic anhydride is reacted with an amine to produce a reaction product consisting essentially of succinimide and a bis-succinimide and reacting said reaction product with a reducing agent.

5. The composition of claim 2 wherein the said alkenyl group contains from 20 to 300 carbon atoms.

6. The composition of claim 1 wherein the maleic anhydride-olefin adduct is a copolymer of an olefin having a molecular weight in the range of from about 80 to about 8,000 and maleic anhydride, the copolymer having a final molecular weight of up to 1,000,000.

7. The composition of claim 1 wherein the reducing agent is selected from the group consisting of sodium borohydride, sodium borohydride trimethoxide, sodium bis(2-methoxyethoxy) aluminum hydride and lithium aluminum borohydride.

8. The composition of claim 1 wherein the alkylenepolyamine is an ethylenepolyamine containing from 2 to 10 nitrogen atoms and from 1 to about 9 ethylene groups.

9. The composition of claim 8 wherein the ethylenepolyamine is tetraethylenepentamine.

References Cited
UNITED STATES PATENTS

| | | | |
|---|---|---|---|
| 3,332,938 | 7/1967 | Mayhew et al. | 252—51.5 AX |
| 3,250,716 | 5/1966 | Akers | 252—51.5 AX |
| 3,219,666 | 11/1965 | Norman et al. | 252—51.5 AX |
| 3,423,381 | 1/1969 | Merijan et al. | 44—63 X |

FOREIGN PATENTS

| | | | |
|---|---|---|---|
| 928,007 | 6/1963 | Great Britain | 260—326.8 |

OTHER REFERENCES

Dennis M. Bailey et al., "Reduction of Cyclic Anhyhydrides with NaBHY, Versatile Lactone Synthesis," J. Org. Chem. (1970), pp. 3574–6.

PATRICK P. GARVIN, Primary Examiner
A. H. METZ, Assistant Examiner

U.S. Cl. X.R.
44—62, 63; 252—51.5 A, 77; 260—78.5 T